US011657625B2

(12) United States Patent
Marcotte

(10) Patent No.: US 11,657,625 B2
(45) Date of Patent: May 23, 2023

(54) SYSTEM AND METHOD FOR DETERMINING IMPLICIT LANE BOUNDARIES

(71) Applicant: Toyota Research Institute, Inc., Los Altos, CA (US)

(72) Inventor: Ryan J. Marcotte, Ann Arbor, MI (US)

(73) Assignee: Toyota Research Institue, Inc., Los Altos, CA (US)

( * ) Notice: Subject to any disclaimer, the term of this patent is extended or adjusted under 35 U.S.C. 154(b) by 342 days.

(21) Appl. No.: 17/126,956

(22) Filed: Dec. 18, 2020

(65) Prior Publication Data

US 2022/0198198 A1 Jun. 23, 2022

(51) Int. Cl.
| | | |
|---|---|---|
| *G06V 20/56* | (2022.01) | |
| *G06F 17/18* | (2006.01) | |
| *G01C 21/32* | (2006.01) | |
| *G06N 3/08* | (2023.01) | |

(52) U.S. Cl.
CPC ........... *G06V 20/588* (2022.01); *G01C 21/32* (2013.01); *G06F 17/18* (2013.01); *G06N 3/08* (2013.01)

(58) Field of Classification Search
CPC ...... G06V 20/588; G06V 10/82; G01C 21/32; G01C 21/3822; G01C 21/387; G01C 21/3658; G06F 17/18; G06N 3/08; G06N 3/045
See application file for complete search history.

(56) References Cited

U.S. PATENT DOCUMENTS

| | | | |
|---|---|---|---|
| 6,925,194 B2 | 8/2005 | Ham | |
| 9,355,321 B2 | 5/2016 | Wujcicki | |
| 10,545,029 B2 | 1/2020 | Yang et al. | |
| 10,576,984 B2 | 3/2020 | Kanzawa | |
| 11,255,678 B2 * | 2/2022 | Racz | ........................ G01S 19/13 |
| 2014/0244142 A1 * | 8/2014 | Matsubara | .......... B60W 10/184 701/116 |
| 2015/0149076 A1 * | 5/2015 | Strauss | .................... G01C 21/34 701/410 |
| 2018/0225835 A1 * | 8/2018 | Harada | .................... G01C 21/34 |
| 2018/0285659 A1 * | 10/2018 | Kwant | ................. G06V 20/588 |
| 2019/0266418 A1 | 8/2019 | Xu et al. | |
| 2020/0160068 A1 | 5/2020 | Silver et al. | |
| 2020/0393265 A1 * | 12/2020 | Piao | .................... G01C 21/3815 |
| 2021/0122364 A1 * | 4/2021 | Lee | ....................... G06V 10/764 |

(Continued)

*Primary Examiner* — Solomon G Bezuayehu
(74) *Attorney, Agent, or Firm* — Christopher G. Darrow; Darrow Mustafa PC

(57) ABSTRACT

A system and related method determines implicit lane boundaries by generating a bird's eye view of a portion of a road having a first lane and a second lane from environment data having information related to the road, overlaying a grid having cells onto the bird's eye view of the portion of the road, determining cells of the grid that form at least portions of the first lane of the road, determining cells of the grid that form at least portions of the second lane of the road, and determining a probability for one or more cells of the grid indicating a likelihood that a vehicle will travel upon portions of the road represented by the cells of the grid when traveling from the first lane to the second lane. The probability for one or more cells of the grid may be generated by a neural network trained with training data.

18 Claims, 13 Drawing Sheets

(56) References Cited

U.S. PATENT DOCUMENTS

| | | | |
|---|---|---|---|
| 2021/0142077 A1* | 5/2021 | Cox | G06V 10/82 |
| 2021/0276574 A1* | 9/2021 | Efrat Sela | G06N 3/04 |
| 2022/0099457 A1* | 3/2022 | Shibayama | G01C 21/3841 |

* cited by examiner

SYSTEM AND METHOD FOR DETERMINING IMPLICIT LANE BOUNDARIES

TECHNICAL FIELD

The subject matter described herein relates, in general, to systems and methods for determining implicit lane boundaries, especially within intersections.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Lane boundaries for roads that vehicles travel upon may be delineated using a visual marker, such as painted lane lines, lane reflectors, and the like. These visual markers may provide guidance to a driver for piloting their vehicle along a road. Additionally, some vehicles have sensors that can detect these visual markers and autonomously guide the vehicle to travel in lanes delineated by these visual markers.

However, there are numerous instances where visual markers do not delineate lane boundaries. In some cases, visual markers on some roads may have faded over time, making them more difficult to detect by either a human operator or a sensor. In other situations, such as intersections, no visual markers may have ever been provided. Generally, because intersections allow vehicles to change from one lane of a road to another lane of a road, intersections do not have visual markers, which may confuse a driver or an autonomous vehicle system. In these situations, drivers and autonomous vehicle systems must simply estimate where they believe lane boundaries should exist and then pilot the vehicle within these lane boundaries. While human drivers are generally well-versed in implicitly determining lane boundaries through intersections, some autonomous vehicle systems struggle to perform this action safely and efficiently.

SUMMARY

This section generally summarizes the disclosure and is not a comprehensive explanation of its full scope or all its features.

In one example, a method for determining an implicit lane boundary generally includes the steps of generating a bird's eye view of a portion of a road having a first lane and a second lane from environment data having information related to the road, overlaying a grid having cells onto the bird's eye view of the portion of the road, determining cells of the grid that form at least portions of the first lane of the road, determining cells of the grid that form at least portions of the second lane of the road, and determining a probability for one or more cells of the grid indicating a likelihood that a vehicle will travel upon portions of the road represented by the cells of the grid when traveling from the first lane to the second lane. The probability for one or more cells of the grid may be generated by a neural network trained with training data.

Training data may be generated by obtaining training sensor data from a training data generation sensor that is configured to collect data having information regarding an observed road environment and a movement of one or more observed vehicles within the observed road environment, generating a ground truth bird's eye view of the observed road environment, overlaying a ground truth grid having cells onto the ground truth bird's eye view, and labeling the cells of the ground truth grid based on the movement of one or more observed vehicles within the observed road environment.

In another example, a system for determining implicit lane boundaries includes a processor and a memory that is in communication with the processor. The memory may include a lane boundary determination module that includes instructions that, when executed by the processor, cause the processor to generate a bird's eye view of a portion of a road having a first lane and a second lane from environment data having information related to the road, overlay a grid having cells onto the bird's eye view of the portion of the road, determine cells of the grid that form at least portions of the first lane of the road, determine cells of the grid that form at least portions of the second lane of the road, and determine a probability for one or more cells of the grid indicating a likelihood that a vehicle will travel upon portions of the road represented by the cells of the grid when traveling from the first lane to the second lane. Like before, the probability for one or more cells of the grid may be generated by a neural network trained with training data.

In yet another embodiment, a non-transitory computer-readable medium includes instructions that, when executed by a processor, cause the processor to generate a bird's eye view of a portion of a road having a first lane and a second lane from environment data having information related to the road, overlay a grid having cells onto the bird's eye view of the portion of the road, determine cells of the grid that form at least portions of the first lane of the road, determine cells of the grid that form at least portions of the second lane of the road, and determine a probability for one or more cells of the grid indicating a likelihood that a vehicle will travel upon portions of the road represented by the cells of the grid when traveling from the first lane to the second lane. Again, the probability for one or more cells of the grid may be generated by a neural network trained with training data.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Figure 1:
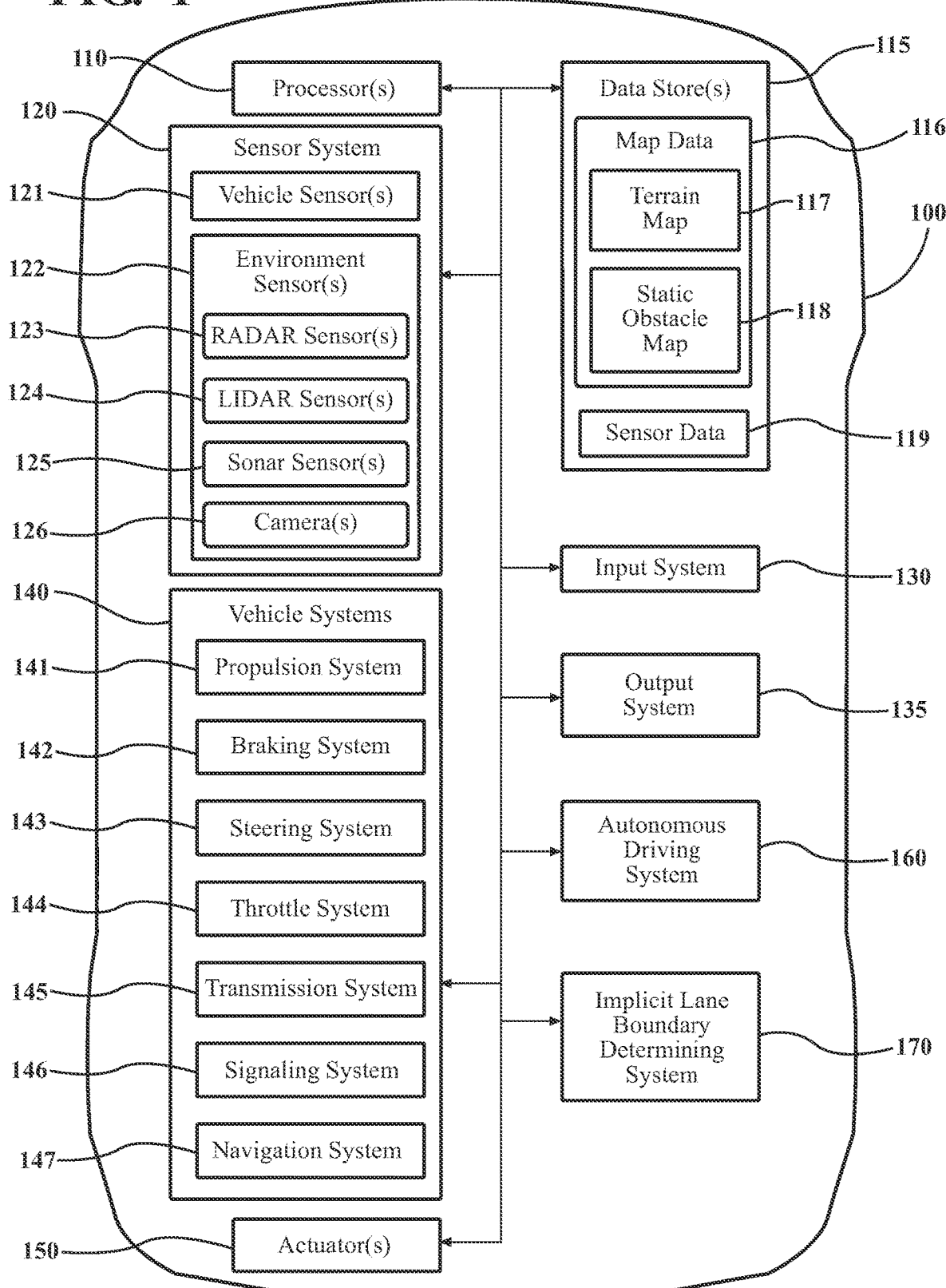
FIG. 1 illustrates one example of a vehicle incorporating a system for determining implicit lane boundaries.

Described are systems and methods for determining implicit lane boundaries and for generating training data to train the system for determining implicit lane boundaries. Regarding the system and method for determining implicit lane boundaries, the system and method first generate a bird's eye view of a portion of a road that may include one or more lanes. In some cases, the portion of the road may include an intersection that allows vehicles to turn from one lane to another. The system and method may determine which areas of the bird's eye view are travelable by vehicle. These areas may include the portions of the road that include the lanes.

The system and method may overlay a grid having cells onto the travelable areas. The system and method determines the lane that a vehicle is currently located in and the lane that the vehicle wishes to travel to. For example, the vehicle may be traveling north in a lane but wishes to turn left and travel west when reaching an intersection. The corresponding cells of the grid that relate to the lane that the vehicle is currently in and the vehicle wishes to travel to are determined.

Once this occurs, the system and method determines which cells of the grid will likely be utilized to navigate the vehicle from one lane to another. The system and method may determine probabilities for the cells indicating the likelihood that a vehicle will travel upon portions of the road represented by cells of the grid when traveling from one lane to another. Using this information, the system and method may then pilot the vehicle from one lane to another by utilizing portions of the road having cells that have the highest determined probability.

As to generating training data to train the system for determining implicit lane boundaries, the system and method may collect sensor data that observes the movement of vehicles from one lane to another. In one example, the sensor data may be collected from vehicles as they travel from lane to lane. In another example, the sensor data may be collected from one or more fixed sensors that observe a particular set of lanes and how vehicles travel from lane to lane, especially though intersections. As such, the collected sensor data may be utilized to generate a ground truth bird's eye view of an observed road environment, overlay a ground truth grid having cells onto the ground truth bird's eye view, and label the cells of the ground truth grid based on the movement of vehicles as observed. This information may then be utilized to train a neural network of a system that determines implicit lane boundaries.

If the neural network is trained on data taken from a representative set of intersections, the neural network can determine implicit lane boundaries for intersections that have not previously been encountered or observed. Moreover, it is not the case that the neural network would need a separate trained model, with corresponding training data, for each intersection. The bird's eye view with overlaid cells can represent any intersection. The neural network learns to the largest extent possible how implicit lane boundaries can be generated in any intersections similar to the ones contained in the corpus of training data.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, includes one or more automated or autonomous systems and thus benefits from the functionality discussed herein.

In various embodiments, the automated/autonomous systems or combination of systems may vary. For example, in one aspect, the automated system is a system that provides autonomous control of the vehicle according to one or more levels of automation such as the levels defined by the Society of Automotive Engineers (SAE) (e.g., levels 0-5). The autonomous system may provide semi-autonomous control or fully autonomous control, as discussed in relation to the autonomous driving system 160.

The vehicle 100 also includes various elements. It will be understood that in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 1 and will be described along with subsequent figures. However, a description of many of the elements in FIG. 1 will be provided after the discussion of FIGS. 2-13 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. It should be understood that the embodiments described herein may be practiced using various combinations of these elements.

In either case, the vehicle 100 includes an implicit lane boundary determining system 170. The implicit lane boundary determining system 170 may be incorporated within the autonomous driving system 160 or may be separate as shown. Generally, as will be explained in greater detail later in this specification, the implicit lane boundary determining system 170 may be able to implicitly determine lane boundaries, even when no lane markers are present. Using this information, the implicit lane boundary determining system 170 can determine a lane that the vehicle 100 is currently traveling in, a lane that the vehicle 100 wishes to travel to, and determine an appropriate path for the vehicle to travel from its current lane to its intended lane. Additionally or alternatively, the implicit lane boundary determining system 170 may generate training data to train a corresponding system.

Figure 2:
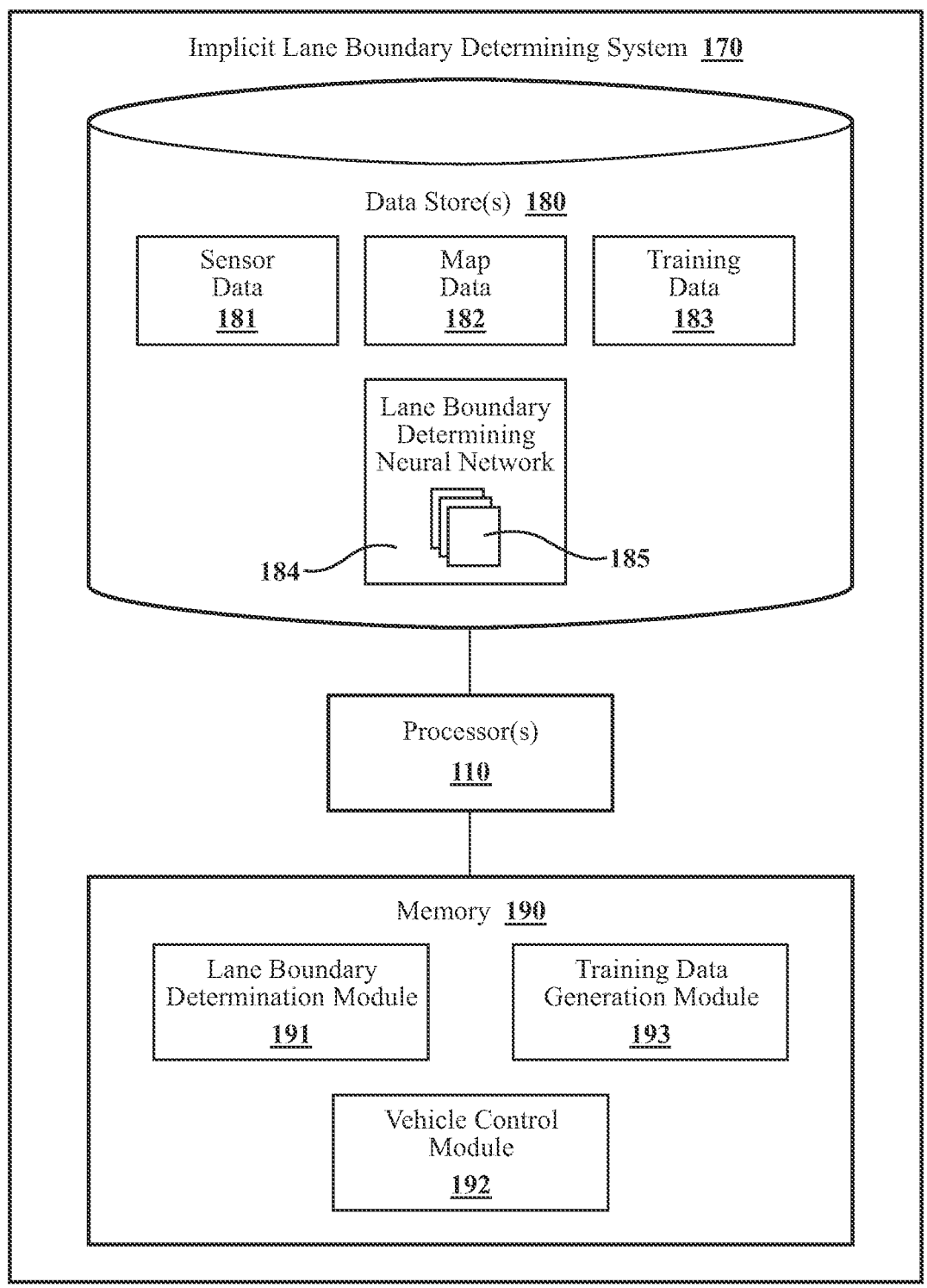
FIG. 2 illustrates a more detailed view of a system for determining implicit lane boundaries.
Figure 3:
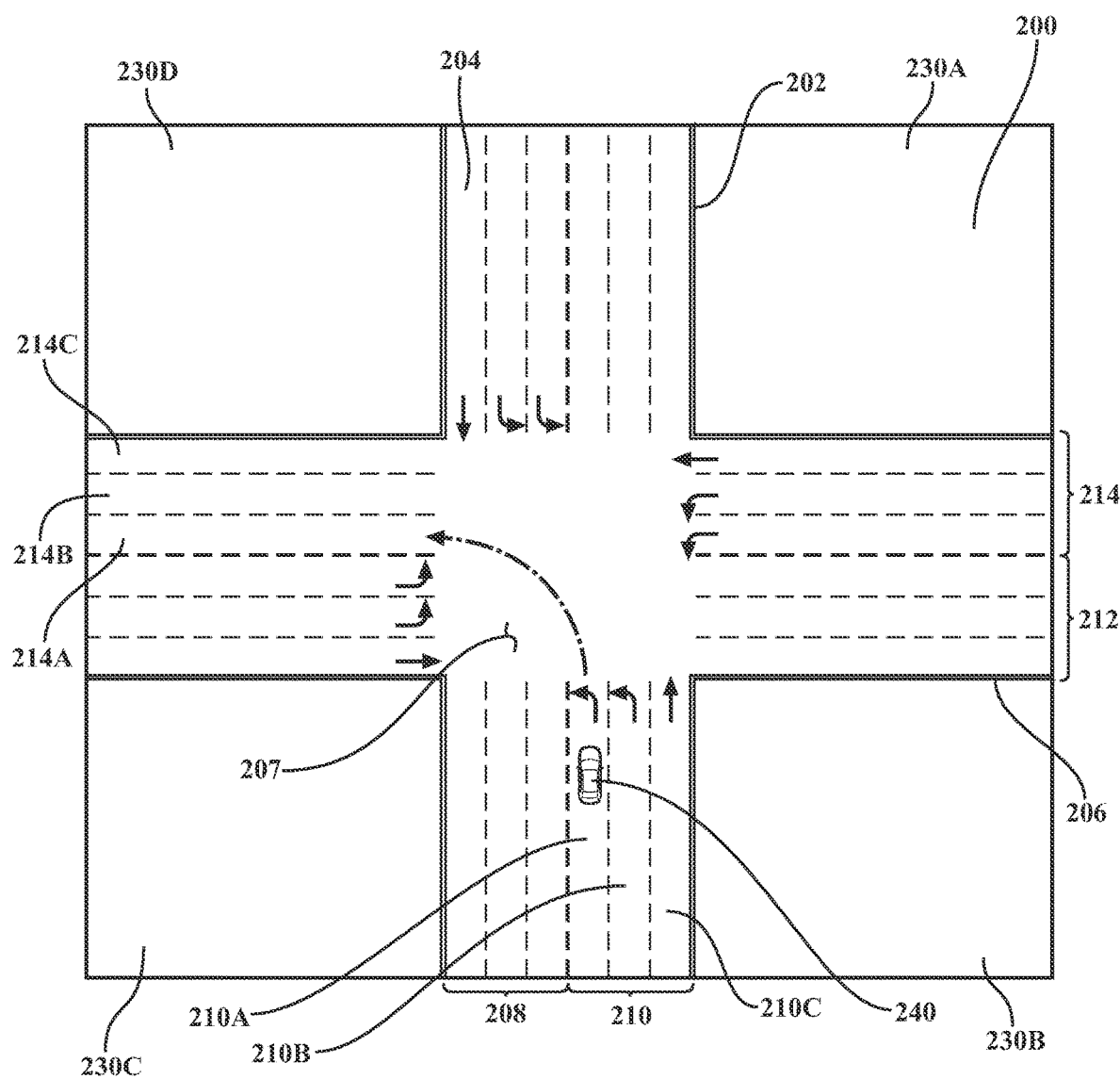
FIG. 3 illustrates a bird's eye view of an intersection of a road.
Figure 4:
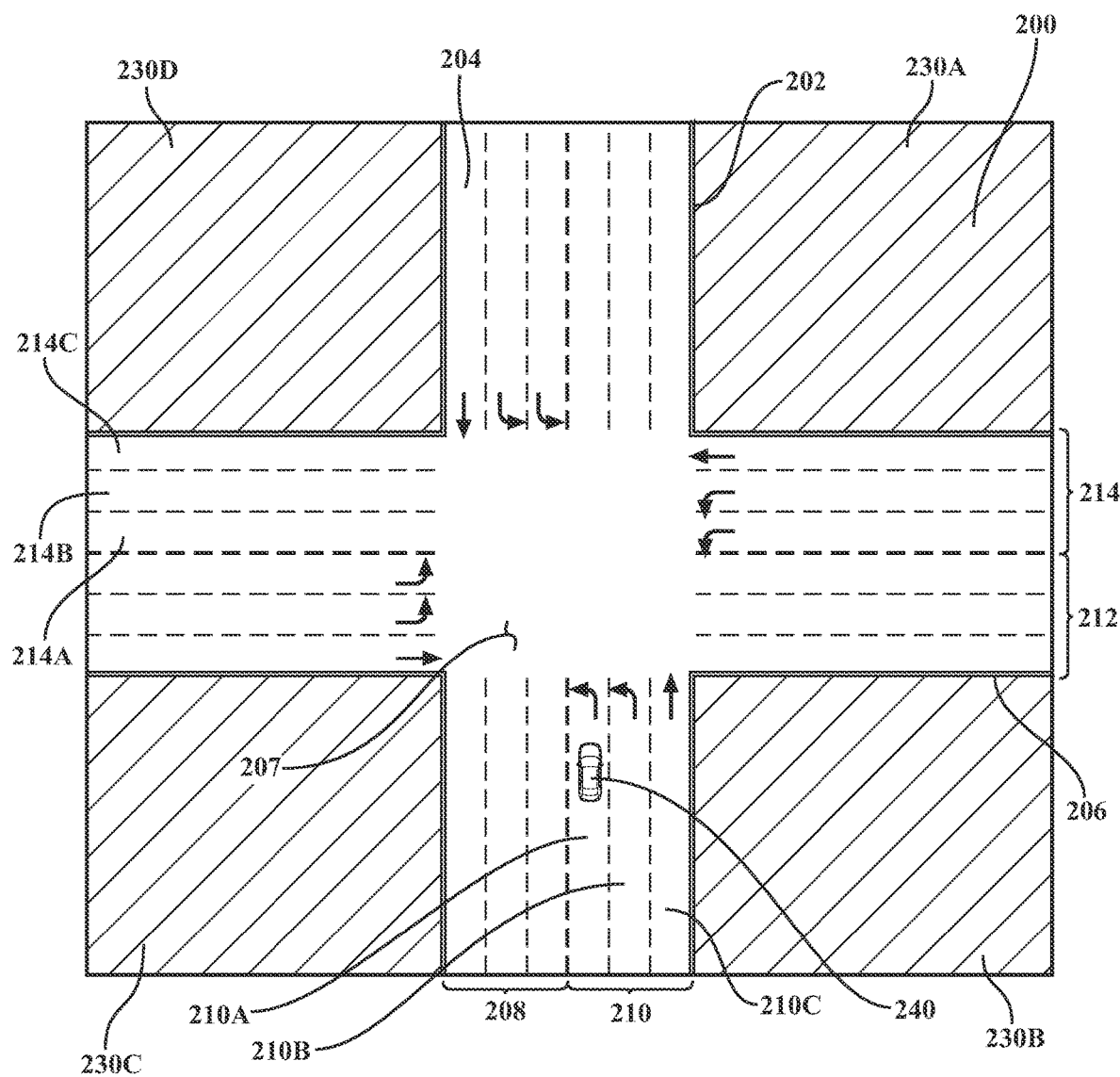
FIG. 4 illustrates the bird's eye view of FIG. 3, wherein non-travelable areas have been delineated.

With reference to FIG. 2, one embodiment of the implicit lane boundary determining system 170 is further illustrated. As shown, the implicit lane boundary determining system 170 includes one or more processor(s) 110. Accordingly, the processor(s) 110 may be a part of the implicit lane boundary determining system 170, or the implicit lane boundary determining system 170 may access the processor(s) 110 through a data bus or another communication path. In one or more embodiments, the processor(s) 110 is an application-specific integrated circuit that is configured to implement functions associated with a lane boundary determination module 191, a vehicle control module 192, and/or a training data generation module 193. In general, the processor(s) 110 may be one or more electronic processors, such as a microprocessor, capable of performing various functions described herein. In one embodiment, the implicit lane boundary determining system 170 includes a memory 190 that stores the lane boundary determination module 191, the vehicle control module 192, and/or the training data generation module 193. The memory 190 may be a random-access memory (RAM), read-only memory (ROM), a hard disk drive, a flash memory, or other suitable memory for storing the lane boundary determination module 191, the vehicle control module 192, and/or the training data generation module 193. The lane boundary determination module 191, the vehicle control module 192, and/or the training data generation module 193 are, for example, computer-readable instructions that, when executed by the processor(s) 110, cause the processor(s) 110 to perform the various functions disclosed herein.

Furthermore, in one embodiment, the implicit lane boundary determining system 170 includes one or more data store(s) 180. The data store(s) 180 is, in one embodiment, an electronic data structure such as a database that is stored in the memory 190 or another memory and that is configured with routines that can be executed by the processor(s) 110 for analyzing stored data, providing stored data, generating data, organizing stored data, and so on. Thus, in one embodiment, the data store(s) 180 stores data used and/or generated by the lane boundary determination module 191, the vehicle control module 192, and/or the training data generation module 193 in executing various functions. In one embodiment, the data store(s) 180 may store the sensor data 181 collected from the sensor system 120 of the vehicle 100, map data 182 that may include map information, such as the configurations of roads and intersections, training data 183, and/or a lane boundary determining neural network 184. The map data 182 may be the same as the map data 116 shown in FIG. 1 and later described in this specification.

The lane boundary determining neural network 184 may be trained utilizing the training data 183. In one example, the lane boundary determining neural network 184 may be a convolutional neural network but could be any type of neural network. The training of the lane boundary determining neural network 184 may cause one or more model weights 185 to be adjusted to improve the performance of the lane boundary determining neural network 184. As will be described in greater detail later in the specification, the lane boundary determining neural network 184 may be utilized to implicitly determine lane boundaries, especially lane boundaries for roads that do not have visual markers.

The lane boundary determination module 191 includes instructions that, when executed by the processor(s) 110, cause the processor(s) 110 to generate a bird's eye view of a portion of a road having a first lane and a second lane from environment data. The environment data includes information related to the road and the surrounding environment. For example, the processor(s) 110 may receive environment data from a number of different sources, such as the sensor data 181 collected by the sensor system 120 of the vehicle 100 and/or map data 182. As previously explained, the map data 182 may include map data regarding one or more roads and the configuration of these roads, including the location of lanes, road types, points of interest, and the like. The sensor data 181 may include sensor data from sensors, such as the environment sensor(s) 122 of the sensor system 120, mounted within the vehicle 100 or sensors remote from the vehicle 100. For example, instead of or in addition to sensor data from the sensor system 120, sensor data could be collected from sensors located at a fixed location, such as near a particular intersection.

As stated before, using information regarding the environment, the lane boundary determination module 191 may cause the processor(s) 110 to generate a bird's eye view of a portion of a road having a first lane and the second lane. Essentially, the bird's eye view generated by the processor(s) 110 is an electronic data structure. For example, reference is made to FIG. 3, which illustrates a bird's eye view 200 of a road network 202 that includes roads 204 and 206. In this example, the road 204 extends north/south, while the road 206 extends east/west. It should be understood that the example of the bird's eye view 200 is just one type of example. The bird's eye view 200 may vary significantly based on the environment and the type of road or roads illustrated within the bird's eye view 200.

Here, the road 204 includes three northbound lanes 210 and three southbound lanes 208. The road 206 includes three eastbound lanes 212 and three westbound lanes 214. An intersection 207 is defined where the road 204 intersects the road 206. While the lanes 212 and 214 of the road 206 and the lanes 208 and 210 of the road 204 are delineated by lane markers outside of the intersection 207, it is noted that none of the lanes 208, 210, 212, and 214 are delineated with corresponding lane markers within the intersection 207. As such, if a vehicle 240, which may be similar to the vehicle 100 of FIG. 1, is traveling along lane 210A of lanes 210 (which may also include lanes 210B and 210C) of the road 204 and wishes to turn into lane 214A of the lanes 214 (which may also include lanes 214B and 214C) of the road 206, as indicated by the arrow 220, the driver and/or the autonomous driving system 160 cannot rely on lane markers to guide the vehicle 240 when turning from the lane 210A onto the lane 214A.

The lane boundary determination module 191 may cause the processor(s) 110 to determine which portions of the bird's eye view 200 cannot be traveled by a vehicle, such as the vehicle 240. As such, referring to FIG. 4, the bird's eye view 200 has portions 230A-230D delineated as being non-travelable by the vehicle 240. As such, this only leaves the roads 204 and 206 is being travelable by the vehicle 240.

Figure 5:
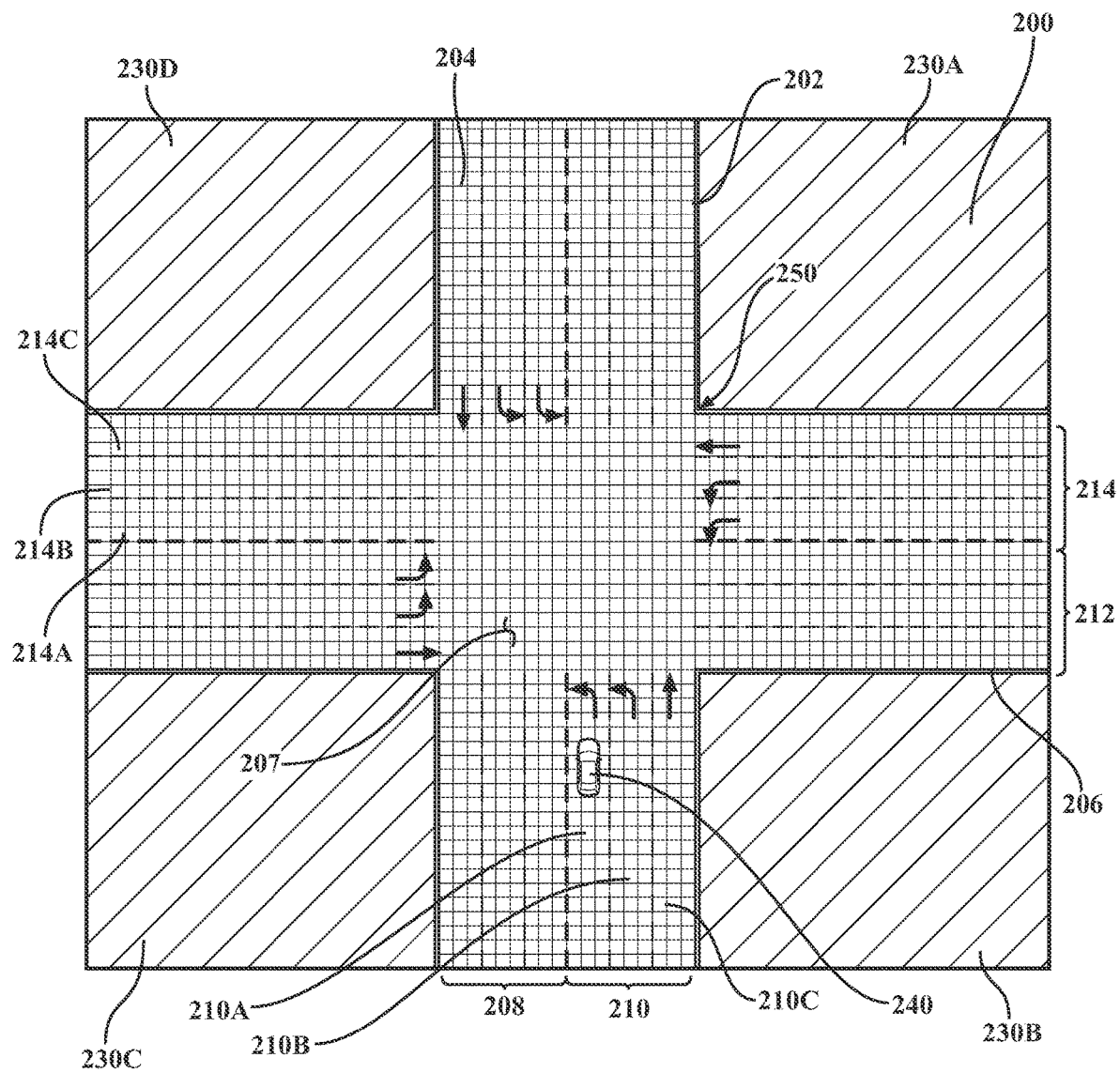
FIG. 5 illustrates the bird's eye view of FIG. 4, wherein a grid having cells has been overlaid on travelable areas.

Referring to FIG. 5, the lane boundary determination module 191 may cause the processor(s) 110 to overlay a grid 250 onto the bird's eye view 200. In this example, the lane boundary determination module 191 causes the processor(s) 110 to overlay the grid 250 onto those portions that are travelable by the vehicle 240. As such, these portions include the road 204 and the road 206. The grid 250 includes cells that define a specific area of the travelable portions of the roads 204 and 206. Typically, the cells that define the grid 250 may represent an area smaller than the vehicle 240. In one example, the cells may be less than a square meter, but could be smaller than that.

Figure 6:
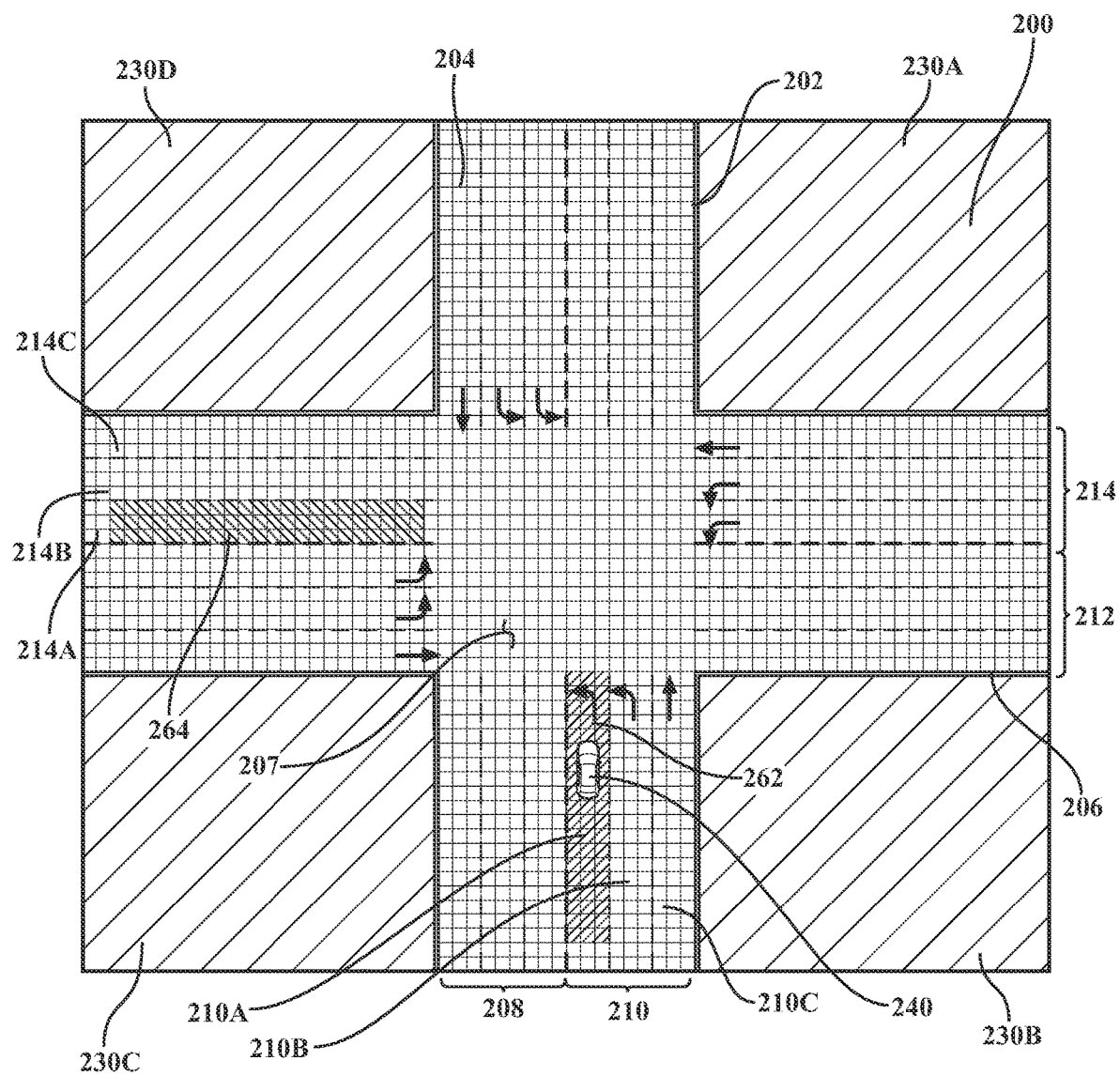
FIG. 6 illustrates the bird's eye view of FIG. 5, wherein cells of the grid relating to a first lane and the second lane have been delineated.
Figure 7:
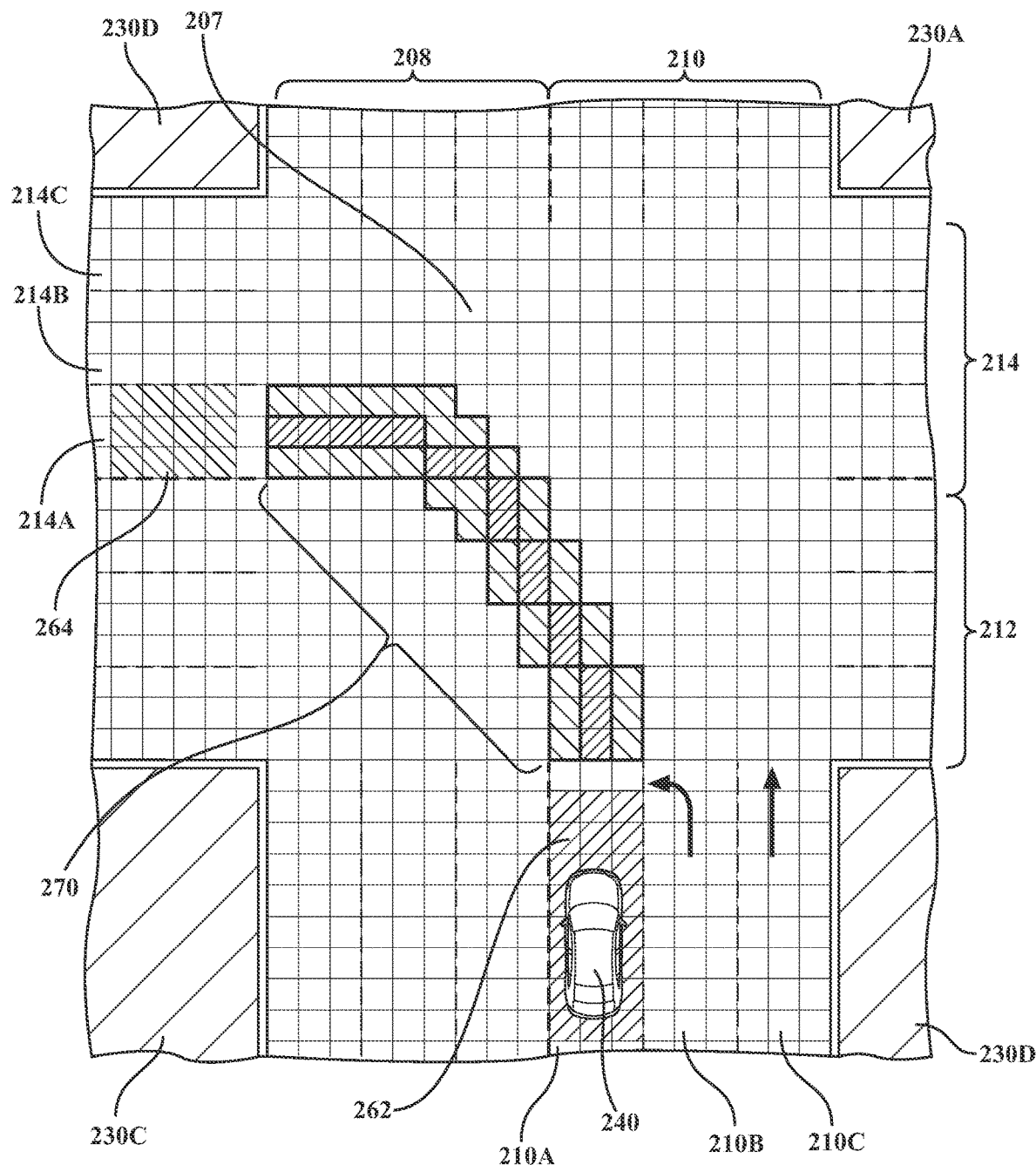
FIG. 7 illustrates a magnified view of the intersection of the bird's eye view of FIG. 6, wherein probabilities have been assigned to cells indicating a likelihood that a vehicle will travel upon portions of the road represented by the cells of the grid when traveling from the first lane to the second lane.
Figure 8:
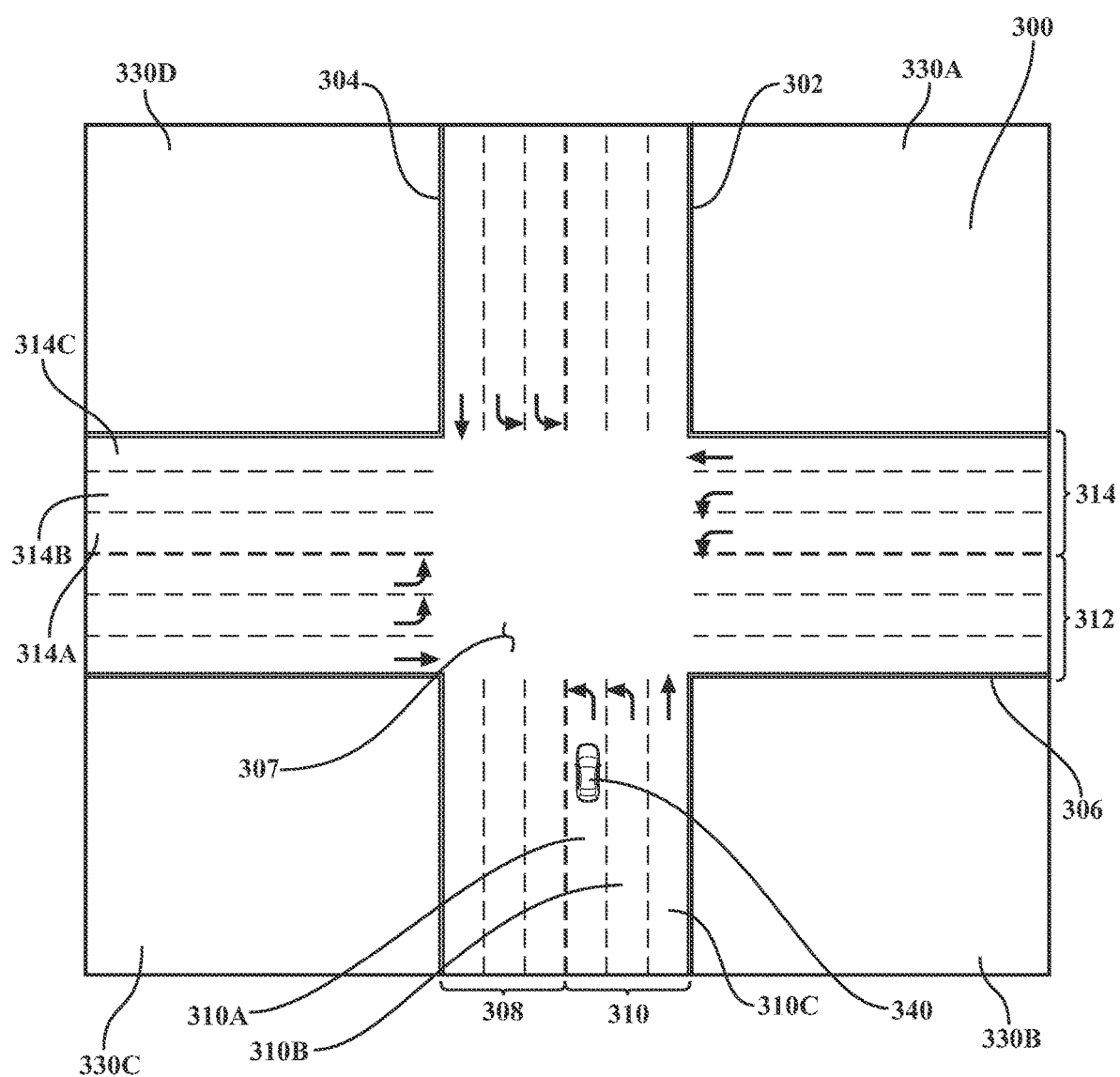
FIG. 8 illustrates a bird's eye view of a road having an intersection that will be observed to generate training data.

Referring to FIG. 6, the lane boundary determination module 191 may then cause the processor(s) 110 to determine which cells of the grid 250 are associated with a lane the vehicle 240 wishes to travel from and the lane the vehicle 240 wishes to travel to. Here, as stated previously, the vehicle 240 wishes to travel from the lane 210A to the lane 214A. As such, in this example, the lane boundary determination module 191 causes the processor(s) 110 to mark the cells 262 of the grid 250 as a first lane (i.e., the lane 210A the vehicle 240 is traveling from) and mark the cells 264 of the grid 250 as a second lane (i.e., the lane 214A the vehicle 240 wishes to travel to).

As stated before, the intersection 207 does not include lane markers that indicate a lane that the vehicle 240 should stay within when traveling from the lane 210A to the lane 214A. As such, some autonomous vehicles have difficulty navigating from the lane 210A to the lane 214A. However, the lane boundary determination module 191 can cause the processor(s) 110 to determine how the vehicle 240 should perform this navigation. Moreover, referring to FIG. 7, the lane boundary determination module 191 causes the processor(s) 110 to determine a probability for one or more cells of the grid 250. This probability indicates the likelihood that vehicle 240 will utilize the cell when traveling from the lane 210A to the lane 214A.

In this example, the cells 270 of the grid 250 representing portions of the roads 204 and/or 206 that the vehicle 240 will utilize when traveling from the lane 210A to the lane 214A are shaded. The cells 270 that are shaded darker indicate a greater probability that the vehicle 240 will travel on portions of the roads 204 and/or 206 indicated by these cells, while the cells 270 that are shaded lighter have a lower likelihood to be utilized by the vehicle 240 when traveling between the lanes 210A and 214A.

The determination of the probability of the cells 270 may be performed by a neural network, such as the lane boundary determining neural network 184. As previously stated, the lane boundary determining neural network 184 may be any suitable neural network, such as a convolutional neural network. The lane boundary determining neural network 184 may include one or more model weights 185 that are adjusted when the lane boundary determining neural network 184 is trained using training data, such as the training data 183. As such, when the lane boundary determining neural network 184 is fully trained, it is expected that the lane boundary determining neural network 184 can accurately determine which cells a vehicle is likely to utilize when traveling from one lane to another.

The lane boundary determining neural network 184 may also utilize priors to enhance the accuracy of determining which cells a vehicle is likely to utilize when traveling from one lane to another. Any type of prior can be utilized. For example, in some situations, some intersections may have lane markers to help guide vehicles when turning onto a lane from another lane. The lane boundary determining neural network 184 may utilize these lane delineations as prior. These lane delineations may be detected by the sensor system 120 of the vehicle 100.

The vehicle control module 192 may include instructions that, when executed by the processor(s) 110, cause the processor(s) 110 to guide the vehicle 240 from the lane 210A to the lane 214A by utilizing the probabilities previously determined for the cells 270. Here, the vehicle control module 192 may cause the processor to receive the probabilities previously determined for the cells 270 and appropriately guide the vehicle 240 by taking control of one or more vehicle systems and/or actuators, such as the vehicle systems 140 and the actuators 150 of the vehicle 100 of FIG. 1, which will be described in greater detail later in this specification. As such, the implicit lane boundary determining system 170 can guide the vehicle 240 from one lane to another lane safely and efficiently even if lane markers are not visible or present.

The implicit lane boundary determining system 170 may also include the ability to generate the training data 183. It should be understood that the implicit lane boundary determining system 170 may be dedicated to implicitly determining lane boundaries, as described in the paragraphs above, or may be dedicated to generating the training data 183, or both.

In this example, the training data generation module 193 includes instructions that, when executed by the processor(s) 110, causes the processor to generate training data 183. Here, the training data generation module 193 may cause the processor(s) 110 to obtain training sensor data from a sensor. In one example, the training sensor data may be generated by the sensor system 120 of the vehicle 100. Alternatively, the training sensor data may be from a fixed sensor, such as one or more cameras located near a road to observe the movement of vehicles along the road. In either case, the training sensor data generally includes an observed road environment in the movement of one or more observed vehicles within the observed road environment. The training sensor data may also utilize map data, such as the map data 182, to capture a more accurate picture of the environment. For example, the training sensor data may include information regarding the movement of vehicles, and map data 182 may be utilized to create the roadway and the environment wherein the vehicles are moving.

In either case, using this collected information from sensors and/or map data, a ground truth bird's eye view of the observed road environment is generated. For example, referring to FIG. 8, a ground truth bird's eye view 300 is shown. The ground truth bird's eye view 300 is one example of the ground truth bird's eye view generated based on collected information from sensors and/or map data. Here, the ground truth bird's eye view 300 is similar to the bird's eye view 200 discussed in FIGS. 3-7. However, it should be understood that the ground truth bird's eye view 300 may take any one of many different forms depending on the environment and vehicles' movement within the environment. Here, the ground truth bird's eye view 300 includes a road network 302 that may include a north/south road 304 and an east/west road 306. The road 304 and the road 306 may intersect an intersection 307. The road 304 includes northbound lanes 310 and southbound lanes 308. The road 306 includes westbound lanes 314 and eastbound lanes 316. The road 304 includes westbound lanes 314 and eastbound lanes 312. Here, the training sensor data has observed the presence of a vehicle 340.

Figure 9:
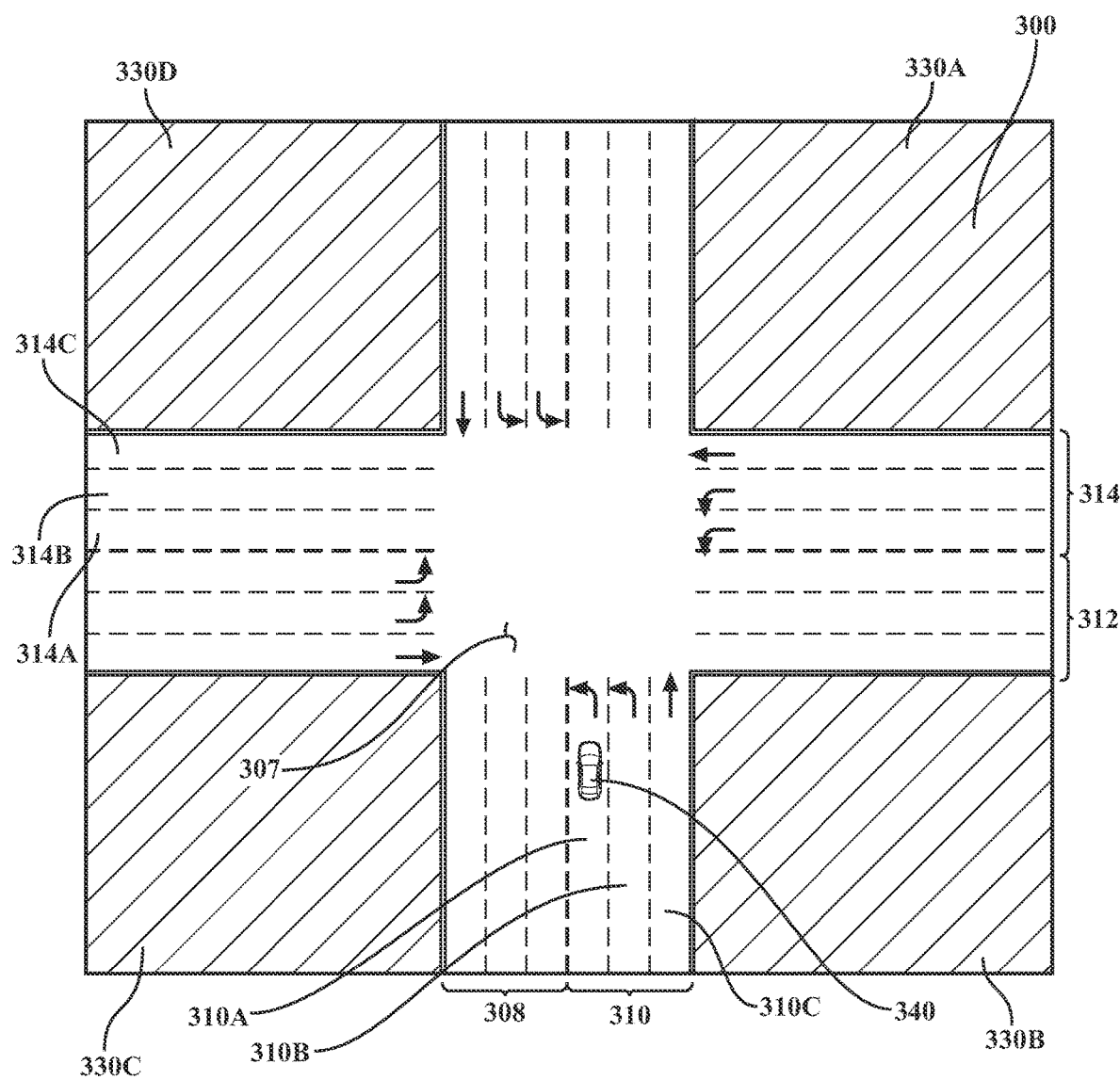
FIG. 9 illustrates a bird's eye view of FIG. 8, wherein non-travelable areas have been delineated.

The training data generation module 193 may cause the processor(s) 110 to determine which areas of the ground truth bird's eye view 300 are travelable by a vehicle, such as the vehicle 340. Referring to FIG. 9, the training data generation module 193 may cause the processor(s) 110 to determine that portions 330A-330B are not travelable by a vehicle, thus leaving the roads 304 and 306 as areas that may be travelable by vehicle, such as the vehicle 340. Thereafter, as best shown in FIG. 10, a ground truth grid 350 having cells are overlaid onto the travelable portions.

Figure 10:
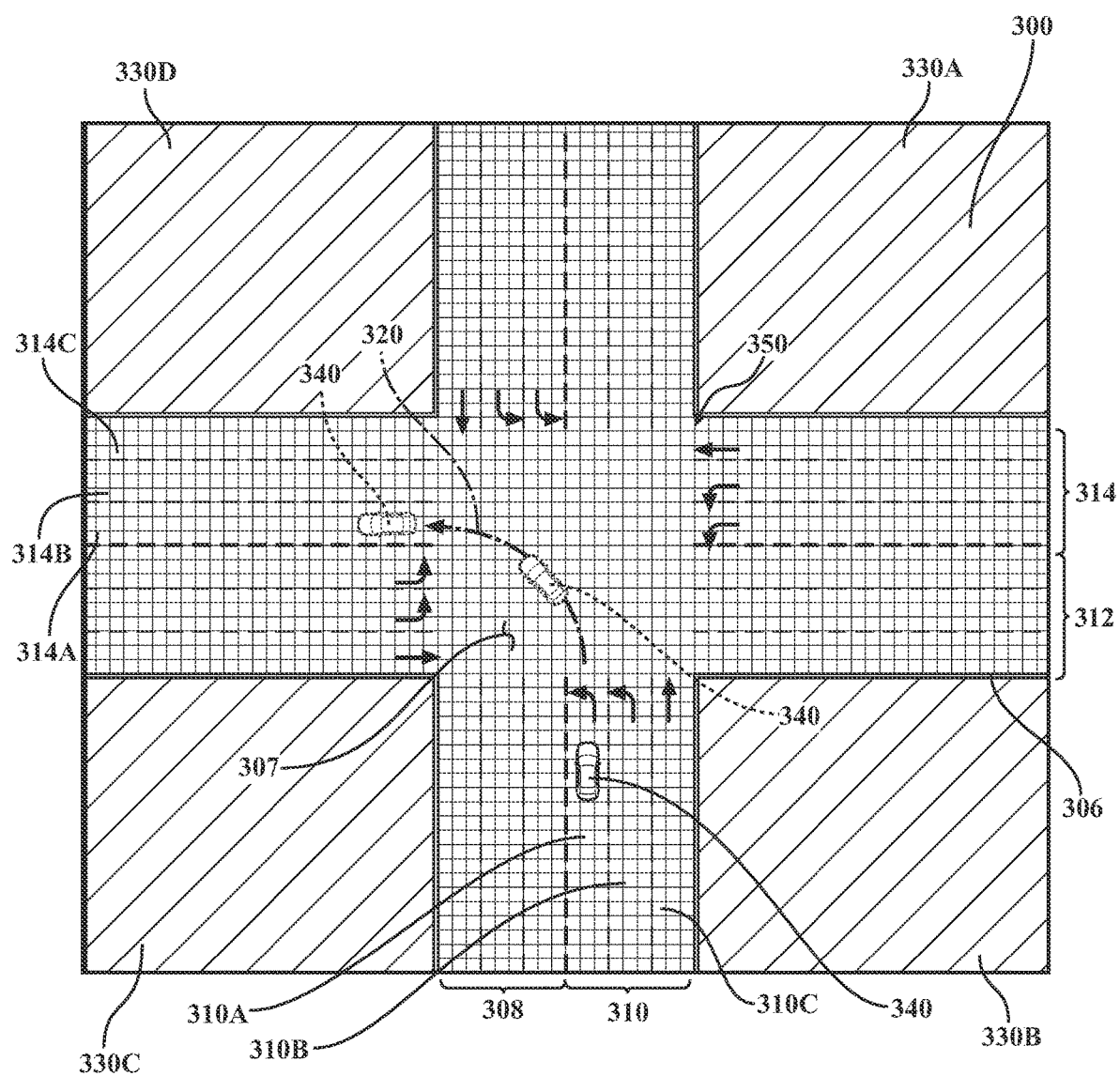
FIG. 10 illustrates a bird's eye view of FIG. 9, wherein a grid having cells has been overlaid onto the bird's eye view of FIG. 9.

Still referring to FIG. 10, in this example, the vehicle 340 travels along the lane 310A and will perform a left-hand turn at the intersection 307 onto the lane 314A, as indicated by the arrow 320. In this example, sensor data from the sensor system of the vehicle 340 will track the movement of the vehicle 340 as it travels from the lane 310A to the lane 314A. While this occurs, the training data generation module 193 will cause the processor(s) 110 to collect sensor data regarding the movement of the vehicle 340 to determine which lane the vehicle 340 traveled from and which lane the vehicle 340 traveled to and label cells of the grid accordingly.

Figure 11:
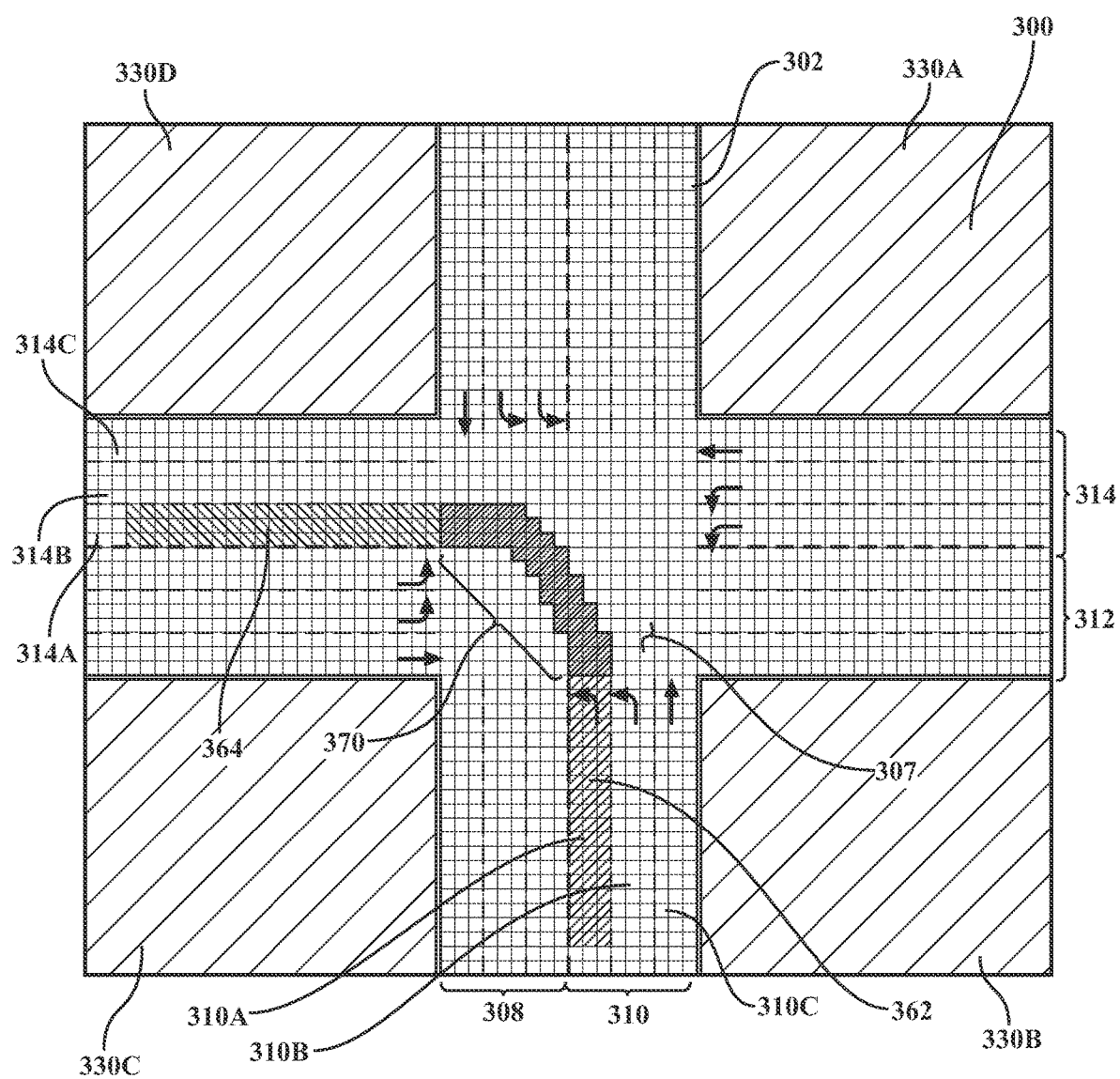
FIG. 11 illustrates the bird's eye view of FIG. 10 having the grid, wherein cells have been labeled that relate to a first lane, a second lane, and cells that an observed vehicle utilized to travel from the first lane to the second lane.

As such, referring to FIG. 11, the training data generation module 193 has caused the processor(s) 110 to label, with a first ground truth lane label, the cells 362 of the ground truth grid 350 as being part of the lane that the vehicle is traveling from. This was achieved by observing the movement of the vehicle 340. Additionally, the training data generation module 193 causes the processor(s) 110 to label, with a second ground truth lane label, the cells 364 representing the lane that the vehicle 340 is traveling to. In addition, the training data generation module 193 causes the processor(s) 110 to label, with a travel path label, the cells 370 that were utilized when traveling from the first lane (as indicated by the cells 362) to the second lane (as indicated by the cells 364).

As such, in this example, the training data generation module 193 causes the processor(s) 110 to generate a ground truth bird's eye view 300 that includes a ground truth grid 350 having cells that are labeled that indicate the first lane that a vehicle is traveling from (cells 362), the second lane that the vehicle is traveling to (cells 364), and how the vehicle navigated from the first lane to the second lane, as indicated by the cells 370. This information is saved as training data 183, which can then be utilized to train the lane boundary determining neural network 184 and adjust the model weights 185 of the lane boundary determining neural network 184 accordingly.

By continuing to observe the movements of vehicles as they change from lane to lane, perform turns, and the like, training data 183 can be generated rapidly and at a low cost. As more training data is generated, the lane boundary determining neural network 184 may be further trained to improve its accuracy across a wide range of different scenarios.

Figure 12:
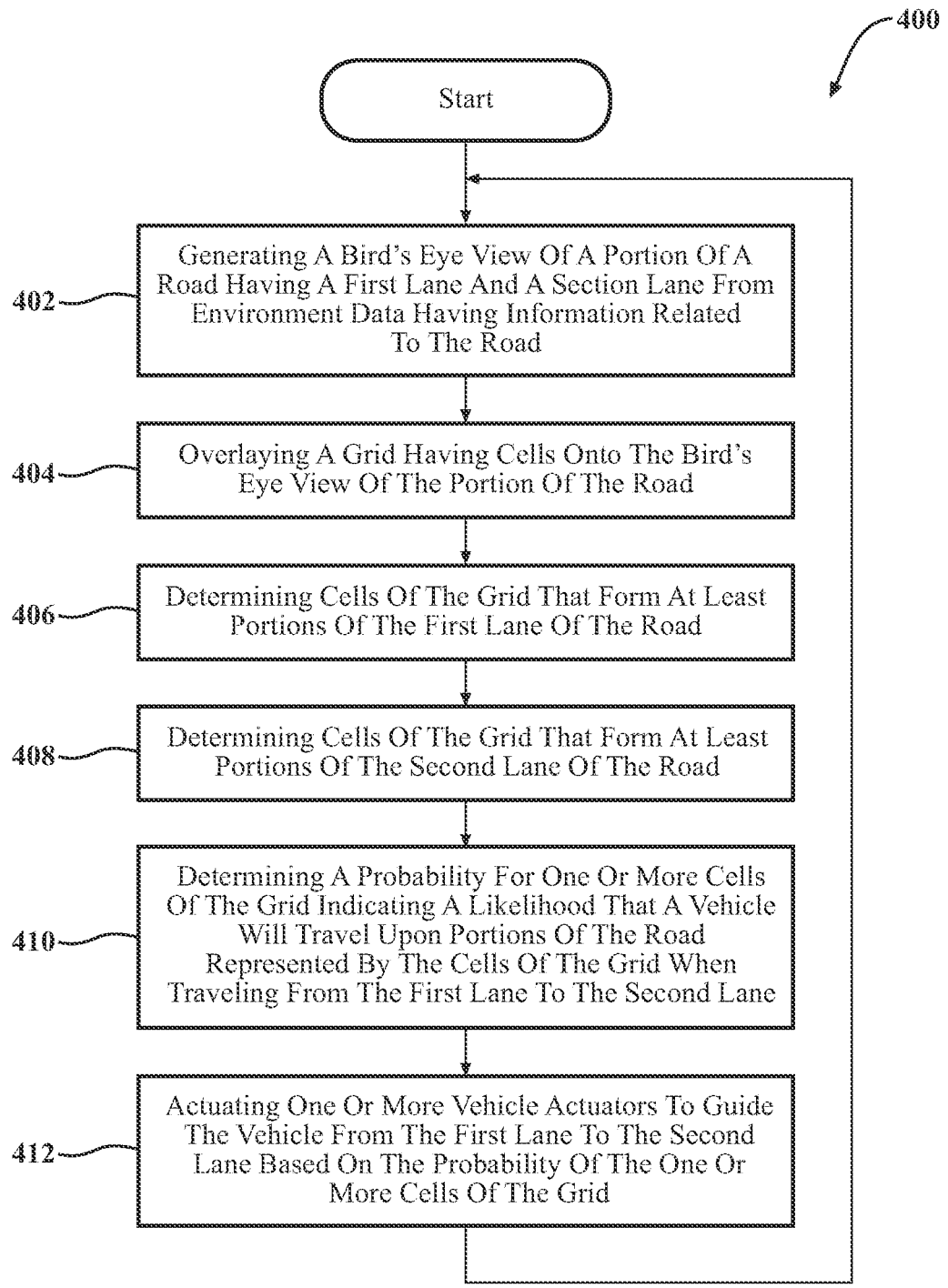
FIG. 12 illustrates a method for implicitly determining lane boundaries.

Referring to FIG. 12, a method 400 for determining implicit lane boundaries is shown. The method 400 will be described from the viewpoint of the vehicle 100 of FIG. 1 and the implicit lane boundary determining system 170 of FIG. 2. However, it should be understood that this is just one example of implementing the method 400. While method 400 is discussed in combination with the implicit lane boundary determining system 170, it should be appreciated that the method 400 is not limited to being implemented within the implicit lane boundary determining system 170, but is instead one example of a system that may implement the method 400.

In step 402, the lane boundary determination module 191 causes the processor(s) 110 to generate a bird's eye view of a portion of a road having a first lane and a second lane from environment data. As explained before, the environment data includes information related to the road and the surrounding environment. For example, the processor(s) 110 may receive environment data from a number of different sources, such as the sensor data 181 collected by the sensor system 120 of the vehicle 100 and/or map data 182.

In step 404, the lane boundary determination module 191 causes the processor(s) 110 to overlay a grid having cells onto the bird's eye view of the portion of the road. For example, as shown in FIG. 5, the lane boundary determination module 191 causes the processor(s) 110 to overlay the grid 250 onto those portions that are travelable by the vehicle 240. As such, these portions include the road 204 and the road 206. The grid 250 includes cells that define a specific area of the travelable portions of the roads 204 and 206.

In step 406 and 408, the lane boundary determination module 191 cause the processor(s) 110 to determine which cells of the grid 250 are associated with a lane the vehicle 240 wishes to travel from and the lane the vehicle 240 wishes to travel to. As shown in FIG. 6 and previously described, the lane boundary determination module 191 causes the processor(s) 110 to mark the cells 262 of the grid 250 as a first lane (i.e., the lane 210A the vehicle 240 is traveling from) and mark the cells 264 of the grid 250 as a second lane (i.e., the lane 214A the vehicle 240 wishes to travel to).

In step 410, the lane boundary determination module 191 causes the processor(s) 110 to determine a probability for one or more cells of the grid 250. This probability indicates the likelihood that vehicle 240 will utilize the cell when traveling from the lane 210A to the lane 214A. For example, referring to FIG. 7, the cells 270 of the grid 250 representing portions of the roads 204 and/or 206 that the vehicle 240 will utilize when traveling from the lane 210A to the lane 214A are shaded. The cells 270 that are shaded darker indicate a greater probability that the vehicle 240 will travel on portions of the roads 204 and/or 206 indicated by these cells, while the cells 270 that are shaded lighter have a lower likelihood to be utilized by the vehicle 240 when traveling between the lanes 210A and 214A.

In step 412, the vehicle control module 192 causes the processor(s) 110 to guide the vehicle 240 from the lane 210A to the lane 214A by utilizing the probabilities determined for the cells 270. Here, the vehicle control module 192 may cause the processor to receive the probabilities previously determined for the cells 270 and appropriately guide the vehicle 240.

Figure 13:
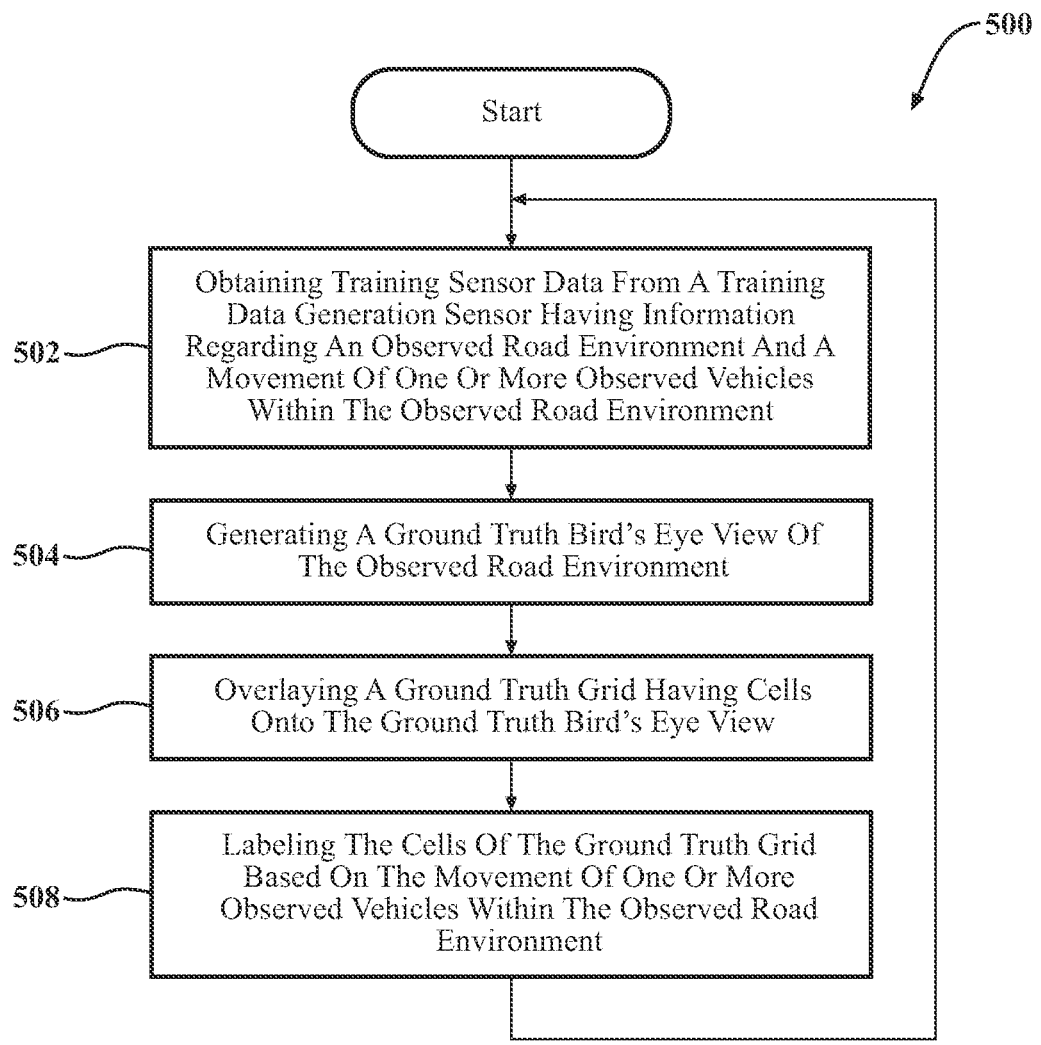
FIG. 13 illustrates a method for generating training data to train a system for determining implicit lane boundaries.

Referring to FIG. 13, a method 500 for generating training data for training an implicit lane boundary determining system is shown. The method 500 will be described from the viewpoint of the vehicle 100 of FIG. 1 and the implicit lane boundary determining system 170 of FIG. 2. However, it should be understood that this is just one example of implementing the method 500. While method 500 is discussed in combination with the implicit lane boundary determining system 170, it should be appreciated that the method 500 is not limited to being implemented within the implicit lane boundary determining system 170, but is instead one example of a system that may implement the method 500.

In step 502, the training data generation module 193 causes the processor to obtain training sensor data from a sensor. In one example, the training sensor data may be generated by the sensor system 120 of the vehicle 100. Alternatively, the training sensor data may be from a fixed sensor, such as one or more cameras located near a road to observe the movement of vehicles along the road. In either case, the training sensor data generally includes an observed road environment in the movement of one or more observed vehicles within the observed road environment.

In step 504, the training data generation module 193 causes the processor to generate a ground truth bird's eye view of the observed road environment. For example, referring to FIG. 8, a ground truth bird's eye view 300 is shown. The ground truth bird's eye view 300 is one example of the ground truth bird's eye view generated based on collected information from sensors and/or map data.

In step 506, the training data generation module 193 causes the processor(s) 110 to overlaying a ground truth grid having cells onto the ground truth bird's eye view. For example, referring to FIG. 10, a ground truth bird's eye view 300 is shown with a ground truth grid 350 overlaid over travelable portions of the ground truth bird's eye view 300.

In step 508, the training data generation module 193 causes the processor(s) 110 to label the cells of the ground truth grid based on the movement of one or more observed vehicles within the observed road environment. As shown in FIG. 11 and previously described, the training data generation module 193 has caused the processor(s) 110 to label (1) the cells 362 of the ground truth grid 350 as being part of the lane that the vehicle is traveling from, (2) the cells 364 of the ground truth grid 350 as being part of the lane that the vehicle is traveling to, and (3) the cells 370 that were utilized when traveling from the first lane (as indicated by the cells 362) to the second lane (as indicated by the cells 364).

As such, in this example, the training data generation module 193 causes the processor(s) 110 to generate a ground truth bird's eye view 300 that includes a ground truth grid 350 having cells that are labeled that indicate the first lane that a vehicle is traveling from (cells 362), the second lane that the vehicle is traveling to (cells 364), and how the vehicle navigated from the first lane to the second lane, as indicated by the cells 370. This information is saved as training data 183, which can then be utilized to train the lane boundary determining neural network 184 and adjust the model weights 185 of the lane boundary determining neural network 184 accordingly.

FIG. 1 will now be discussed in full detail as an example environment within which the system and methods disclosed herein may operate. In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route.

The vehicle 100 can include one or more processor(s) 110. In one or more arrangements, the processor(s) 110 can be a main processor of the vehicle 100. For instance, the processor(s) 110 can be an electronic control unit (ECU). The vehicle 100 can include one or more data store(s) 115 for storing one or more types of data. The data store(s) 115 can include volatile and/or non-volatile memory. Examples of data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data store(s) 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain map(s) 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle map(s) 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The data store(s) 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data store(s) 115 located onboard the vehicle 100. Alternatively, or in addition, at least a portion of the map data 116 and/or the sensor data 119 can be located in one or more data store(s) 115 that are located remotely from the vehicle 100.

As noted above, the vehicle 100 can include the sensor system 120. The sensor system 120 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as immediate for a particular process or determination to be made, or that enables the processor to keep up with some external process.

In arrangements in which the sensor system 120 includes a plurality of sensors, the sensors can work independently. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensor(s) 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensor(s) 122 configured to acquire, and/or sense driving environment data. "Driving environment data" includes data or information about the external environment in which an autonomous vehicle is located or one or more portions thereof. For example, the one or more environment sensor(s) 122 can be configured to detect, quantify, and/or sense obstacles in at least a portion of the external environment of the vehicle 100 and/or information/data about such obstacles. Such obstacles may be stationary objects and/or dynamic objects. The one or more environment sensor(s) 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensor(s) 122 and/or the one or more vehicle sensor(s) 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement, or groups that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. These systems can include one or more devices, components, and/or a combination thereof, now known or later developed.

The navigation system 147 can include one or more devices, applications, and/or combinations thereof, now known or later developed, configured to determine the vehicle's geographic location 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the implicit lane boundary determining system 170, and/or the autonomous driving system 160 can be operatively connected to communicate with the vehicle systems 140 and/or individual components thereof. For example, returning to FIG. 1, the processor(s) 110 and/or the autonomous driving system 160 can be in communication to send and/or receive information from the vehicle systems 140 to control the movement, speed, maneuvering, heading, direction, etc. of the vehicle 100. The processor(s) 110 and/or the autonomous driving system 160 may control some or all of these vehicle systems 140 and, thus, may be partially or fully autonomous.

The processor(s) 110 and/or the autonomous driving system 160 can be operatively connected to communicate with the vehicle systems 140 and/or individual components thereof. For example, returning to FIG. 1, the processor(s) 110 and/or the autonomous driving system 160 can be in communication to send and/or receive information from the vehicle systems 140 to control the movement, speed, maneuvering, heading, direction, etc. of the vehicle 100. The processor(s) 110 and/or the autonomous driving system 160 may control some or all of these vehicle systems 140.

The processor(s) 110 and/or the autonomous driving system 160 may be operable to control the navigation and/or maneuvering of the vehicle 100 by controlling one or more of the vehicle systems 140 and/or components thereof. For instance, when operating in an autonomous mode, the processor(s) 110 and/or the autonomous driving system 160 can control the vehicle's direction and/or speed 100. The processor(s) 110/or the autonomous driving system 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, direct, command, instruct, and/or enable an event or action to occur or at least be in a state where such event or action may occur, directly or indirectly.

The vehicle 100 can include one or more actuators 150. The actuators 150 can be any element or combination of elements operable to modify, adjust, and/or alter one or more of the vehicle systems 140 or components thereof to responsive to receiving signals or other inputs from the processor(s) 110 and/or the autonomous driving system 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store(s) 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The autonomous driving system 160 can be configured to receive data from the sensor system 120 and/or any other type of system capable of capturing information relating to the vehicle 100 and/or the external environment of the vehicle 100. In one or more arrangements, the autonomous driving system 160 can use such data to generate one or more driving scene models. The autonomous driving system 160 can determine the position and velocity of the vehicle 100. The autonomous driving system 160 can determine the location of obstacles, obstacles, or other environmental features, including traffic signs, trees, shrubs, neighboring vehicles, pedestrians, etc.

The autonomous driving system 160 can be configured to receive and/or determine location information for obstacles within the external environment of the vehicle 100 for use by the processor(s) 110 and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving system 160 either independently or in combination with the implicit lane boundary determining system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data. "Driving maneuver" means one or more actions that affect the movement of a vehicle. Examples of driving maneuvers include accelerating, decelerating, braking, turning, moving in a lateral direction of the vehicle 100, changing travel lanes, merging into a travel lane, and/or reversing, just to name a few possibilities. The autonomous driving system 160 can be configured to implement determined driving maneuvers. The autonomous driving system 160 can cause, directly or indirectly, such autonomous driving maneuvers to be implemented. As used herein, "cause" or "causing" means to make, command, instruct, and/or enable an event or action to occur or at least be in a state where such event or action may occur, either directly or indirectly. The autonomous driving system 160 can be configured to execute various vehicle functions and/or to transmit data to, receive data from, interact with, and/or control the vehicle 100 or one or more systems thereof.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-13, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements can also be embedded in an application product that comprises all the features enabling the implementation of the methods described herein and can carry out these methods when loaded in a processing system.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A method comprising the steps of: generating a bird's eye view of a portion of a road having a first lane and a second lane from environment data having information related to the road; overlaying a grid having cells onto the bird's eye view of the portion of the road; determining cells of the grid that form at least portions of the first lane of the road; determining cells of the grid that form at least portions of the second lane of the road; and determining a probability for one or more cells of the grid indicating a likelihood that a vehicle will travel upon portions of the road represented by the cells of the grid when traveling from the first lane to the second lane, wherein the probability for one or more cells of the grid is generated by a neural network trained with training data.

2. The method of claim 1, wherein the neural network utilizes one or more lane markings as a prior when determining the probability indicating the likelihood that the vehicle will travel upon one or more cells of the grid when traveling from the first lane to the second lane.

3. The method of claim 1, further comprising the steps of: obtaining training sensor data from a training data generation sensor, the training sensor data configured to collect information regarding an observed road environment and a movement of one or more observed vehicles within the observed road environment; generating a ground truth bird's eye view of the observed road environment; overlaying a ground truth grid having cells onto the ground truth bird's eye view; and labeling the cells of the ground truth grid based on the movement of one or more observed vehicles within the observed road environment.

4. The method of claim 3, further comprising the steps of: determining a first ground truth lane, a second ground truth lane, and a travel path taken by one or more observed vehicles between the first ground truth lane and the second ground truth lane; and labeling one or more of the cells of the ground truth grid with a first ground truth lane label based on the first ground truth lane, a second ground truth lane label based on the second ground truth lane, and a travel path label based on the travel path.

5. The method of claim 3, wherein the training data generation sensor is mounted to the one or more observed vehicles.

6. The method of claim 1, further comprising the step of actuating one or more vehicle actuators to guide the vehicle from the first lane to the second lane based on the probability of the one or more cells of the grid.

7. The method of claim 1, wherein an intersection is located between the first lane and the second lane.

8. The method of claim 1, wherein the environment data is generated from one or more of: sensor data collected by one or more sensors of the vehicle and map data collected from one or more electronic maps.

9. A system comprising: a processor; and a memory in communication with the processors, the memory including a lane boundary determination module having instructions, that when executed by the processor, causes the processor to: generate a bird's eye view of a portion of a road having a first lane and a second lane from environment data having information related to the road; overlay a grid having cells onto the bird's eye view of the portion of the road; determine cells of the grid that form at least portions of the first lane of the road; determine cells of the grid that form at least portions of the second lane of the road; and determine a probability for one or more cells of the grid indicating a likelihood that a vehicle will travel upon portions of the road represented by the cells of the grid when traveling from the first lane to the second lane, wherein the probability for one or more cells of the grid is generated by a neural network trained with training data.

10. The system of claim 9, wherein the neural network utilizes one or more lane markings as a prior when determining the probability indicating the likelihood that the vehicle will travel upon one or more cells of the grid when traveling from the first lane to the second lane.

11. The system of claim 9, wherein the memory further includes a training data generation module having instructions, that when executed by the processor, cause the processor to: obtain training sensor data from a training data generation sensor, the training sensor data configured to collect information regarding an observed road environment and a movement of one or more observed vehicles within the observed road environment; generate a ground truth bird's eye view of the observed road environment; overlay a ground truth grid having cells onto the ground truth bird's eye view; and label the cells of the ground truth grid based on the movement of one or more observed vehicles within the observed road environment.

12. The system of claim 11, wherein the training data generation module further includes instructions, that when executed by the processor, cause the processor to: determine a first ground truth lane, a second ground truth lane, and a travel path taken by one or more observed vehicles between the first ground truth lane and the second ground truth lane; and label one or more of the cells of the ground truth grid with a first ground truth lane label based on the first ground truth lane, a second ground truth lane label based on the second ground truth lane, and a travel path label based on the travel path.

13. The system of claim 11, wherein the training data generation sensor is mounted to the one or more observed vehicles.

14. The system of claim 9, wherein the memory further comprises a vehicle control module having instructions, that when executed by the processor, causes the processor to actuate one or more vehicle actuators to guide a vehicle from the first lane to the second lane based on the probability of the one or more cells of the grid.

15. The system of claim 9, wherein an intersection is located between the first lane and the second lane.

16. The system of claim 9, wherein the environment data is generated from one or more of: sensor data collected by one or more sensors of a vehicle and map data collected from one or more electronic maps.

17. A non-transitory computer-readable medium storing instructions that, when executed by a processor, cause the processor to: generate a bird's eye view of a portion of a road having a first lane and a second lane from environment data having information related to the road; overlay a grid having cells onto the bird's eye view of the portion of the road; determine cells of the grid that form at least portions of the first lane of the road; determine cells of the grid that form at least portions of the second lane of the road; and determine a probability, using a neural network trained with training data, for one or more cells of the grid indicating a likelihood that a vehicle will travel upon portions of the road represented by the cells of the grid when traveling from the first lane to the second lane.

18. The non-transitory computer-readable medium of claim 17, further storing instructions that, when executed by the processor, cause the processor to: obtain training sensor data from a training data generation sensor, the training sensor data configured to collect information regarding an observed road environment and a movement of one or more observed vehicles within the observed road environment; generate a ground truth bird's eye view of the observed road environment; overlay a ground truth grid having cells onto the ground truth bird's eye view; and label the cells of the ground truth grid based on the movement of one or more observed vehicles within the observed road environment.

* * * * *